(12) United States Patent
Tsai et al.

(10) Patent No.: US 11,609,429 B2
(45) Date of Patent: Mar. 21, 2023

(54) DISPLAY DEVICE

(71) Applicant: HTC Corporation, Taoyuan (TW)

(72) Inventors: Cheng-Hsiu Tsai, Taoyuan (TW);
Wei-Jen Chang, Taoyuan (TW);
Bao-Jen Shih, Taoyuan (TW);
Fu-Cheng Fan, Taoyuan (TW)

(73) Assignee: HTC Corporation, Taoyuan (TW)

( * ) Notice: Subject to any disclaimer, the term of this patent is extended or adjusted under 35 U.S.C. 154(b) by 282 days.

(21) Appl. No.: 16/898,447

(22) Filed: Jun. 11, 2020

(65) Prior Publication Data

US 2021/0055556 A1 Feb. 25, 2021

Related U.S. Application Data

(60) Provisional application No. 62/890,591, filed on Aug. 22, 2019.

(51) Int. Cl.
*G02B 27/01* (2006.01)
*G02B 5/18* (2006.01)
*G02B 5/30* (2006.01)
*G02F 1/31* (2006.01)

(52) U.S. Cl.
CPC ....... *G02B 27/0172* (2013.01); *G02B 5/1842* (2013.01); *G02B 5/3083* (2013.01); *G02B 27/0176* (2013.01); *G02F 1/31* (2013.01); *G02B 2027/0147* (2013.01); *G02F 2203/07* (2013.01)

(58) Field of Classification Search
CPC .............. G02B 27/0081; G02B 5/3083; G02B 27/0172; G02B 27/0176; G02B 5/1842; G02B 2027/0136; G02B 2027/015; G02B 2027/0147; G02B 27/0101; G02F 1/31; G02F 2203/07
See application file for complete search history.

(56) References Cited

U.S. PATENT DOCUMENTS 10,331,008 B1 * 6/2019 Tam .................... G02F 1/29
2009/0303212 A1 * 12/2009 Akutsu ........... G02B 27/0172
345/204

(Continued)

FOREIGN PATENT DOCUMENTS

CN 102654597 A * 9/2012 ......... G02B 27/2214
CN 104330952 A * 2/2015 ......... G02B 27/2242

(Continued)

OTHER PUBLICATIONS

"Search Report of Europe Counterpart Application", dated Dec. 18, 2020, p. 1-p. 14.

(Continued)

*Primary Examiner* — Hoan C Nguyen
(74) *Attorney, Agent, or Firm* — JCIPRNET

(57) ABSTRACT

A display device includes a display, an image beam shifter, and a light guiding component. The display generates an image beam. The image beam shifter receives the image beam and generates a projected image beam. The light guiding component receives the projected image beam to transport the projected image beam to different positions of a target zone in sequence. The image beam shifter projects the projected image beam to different positions of the light guiding component with time division.

10 Claims, 6 Drawing Sheets

(56) References Cited

U.S. PATENT DOCUMENTS

| | | | |
|---|---|---|---|
| 2014/0055692 A1* | 2/2014 | Kroll | G03H 1/02 |
| | | | 29/846 |
| 2017/0059960 A1 | 3/2017 | Shi et al. | |
| 2017/0270637 A1 | 9/2017 | Perreault et al. | |
| 2018/0095283 A1* | 4/2018 | Takeda | G02B 6/005 |
| 2018/0120559 A1 | 5/2018 | Yeoh et al. | |
| 2018/0231780 A1* | 8/2018 | Huang | G02B 27/0172 |
| 2018/0284440 A1 | 10/2018 | Popovich et al. | |
| 2019/0011628 A1* | 1/2019 | Lee | G02B 6/0035 |
| 2019/0075281 A1 | 3/2019 | Hall et al. | |
| 2019/0219819 A1 | 7/2019 | Hong | |
| 2019/0318677 A1* | 10/2019 | Lu | G02B 27/0093 |

FOREIGN PATENT DOCUMENTS

| | | | | |
|---|---|---|---|---|
| WO | WO-2013110748 A1 * | 8/2013 | | G02B 26/0808 |
| WO | 2017120346 | 7/2017 | | |

OTHER PUBLICATIONS

"Office Action of Taiwan Counterpart Application", dated Jul. 30, 2021, p. 1-p. 8.

* cited by examiner

DISPLAY DEVICE

CROSS-REFERENCE TO RELATED APPLICATION

This application claims the priority benefit of U.S. provisional application Ser. No. 62/890,591, filed on Aug. 22, 2019. The entirety of the above-mentioned patent application is hereby incorporated by reference herein and made a part of this specification.

BACKGROUND OF THE DISCLOSURE

1. Field of the Disclosure

The disclosure relates to a display device, and in particular, to a display device capable of providing a virtual reality image, an augmented reality image, or a mixed reality image.

2. Description of Related Art

With the progress of electronic technologies, it has become an important trend of electronic products to provide high-quality display efficiency. Therefore, a wearable display device capable of providing a virtual reality image, an augmented reality image, or a mixed reality image is developed accordingly.

For the requirements of the wearable display device, the pursuit of its module thinning and high resolution can provide better user experience. However, with the increase in the resolution of a display screen required by a display device, the price, size, and weight of the display device are correspondingly increased. With the increase in the size and weight of the display device, it is inconvenient for a user to carry it. The increase in the price of the display device may reduce consumers' willingness to buy.

SUMMARY OF THE DISCLOSURE

The disclosure is directed to a variety of display devices, which can reduce the size of a wearable display device.

A display device of the disclosure includes a display, an image beam shifter, and a light guiding component. The display generates an image beam. The image beam shifter receives the image beam and generates a projected image beam. The light guiding component receives the projected image beam to transport the projected image beam to different positions of a target zone in sequence. The image beam shifter projects the projected image beams to different positions of the light guiding component with time division.

Another display device of the disclosure includes a display, an image beam shifter, and a light guiding component. The display generates an image beam. The image beam shifter receives the image beam and generates a first projected image beam and a second projected image beam. The light guiding component receives the first projected image beam and the second projected image beam, and transports the first projected image beam to a first target and the second projected image beam to a second target zone, where the first target zone is different from the second target zone.

Based on the above, in embodiments of the disclosure, projected image beams can be transmitted to different positions at the same time or with time division through an image beam shifter. In this way, the area of the display can be effectively reduced, thereby reducing the size and weight of the wearable display device.

DESCRIPTION OF THE EMBODIMENTS

Figure 1:
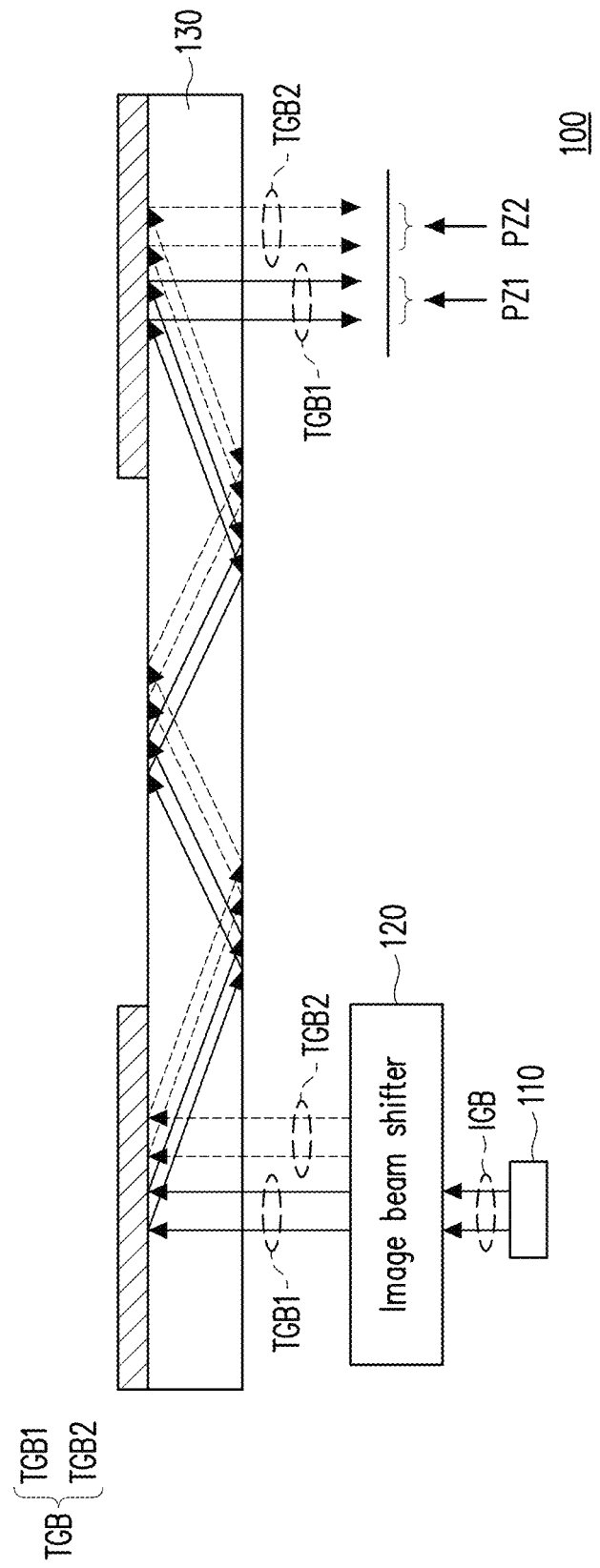
FIG. 1 is a schematic diagram of a display device according to an embodiment of the disclosure.

Referring to FIG. 1, FIG. 1 is a schematic diagram of a display device according to an embodiment of the disclosure. The display device 100 includes a display 110, an image beam shifter 120, and a light guiding component 130. The display 110 is configured to generate an image beam IGB. The image beam shifter 120 is overlapped with the display 110, and receives the image beam IGB generated by the display 110. The image beam shifter 120 may generate a projected image beam TGB according to the image beam IGB. In the present embodiment, the projected image beam TGB generated by the image beam shifter 120 may be projected image beams TGB1 and TGB2 in sequence according to different generation times, and the image beam shifter 120 transmits the projected image beams TGB1 and TGB2 in sequence to the light guiding component 130 in different time intervals respectively.

It is worth noting that in the present embodiment, the image beam shifter 120 may shift the position of at least one of the projected image beams TGB1 and TGB2, and enable a position where the projected image beam TGB1 is emitted on the image beam shifter 120 in a first time interval to be different from a position where the projected image beam TGB2 is emitted on the image beam shifter 120 in a second time interval.

The light guiding component 130 is configured to receive the projected image beams TGB1 and TGB2 with time division. Based on different positions where the projected image beams TGB1 and TGB2 are transmitted, the light guiding component 130 may transport the projected image beams TGB1 and TGB2 in sequence respectively, and project them to a first partition PZ1 and a second partition PZ2 in different positions of a target zone. The light guiding component 130 may be a waveguide, a freeform lens, a half-mirror, and other common optical-see-through augment reality displays.

In the embodiment of the disclosure, the image beam IGB generated by the display 110 in the first time interval may correspond to a first display picture, and the image beam IGB generated by the display 110 in the second time interval may correspond to a second display picture, where the first display picture is different from the second display picture. In this way, a combined display picture where the first display picture and the second display picture are connected to each other can be seen in the target zone. That is, the size and/or the resolution of the display screen generated by the display device can be increased without increasing the size of the display 110.

The display device 100 in the present embodiment may be a display device generating a virtual reality image, an augmented reality image, or a mixed reality image. The display device 100 may be any form of wearable display devices.

Figure 2:
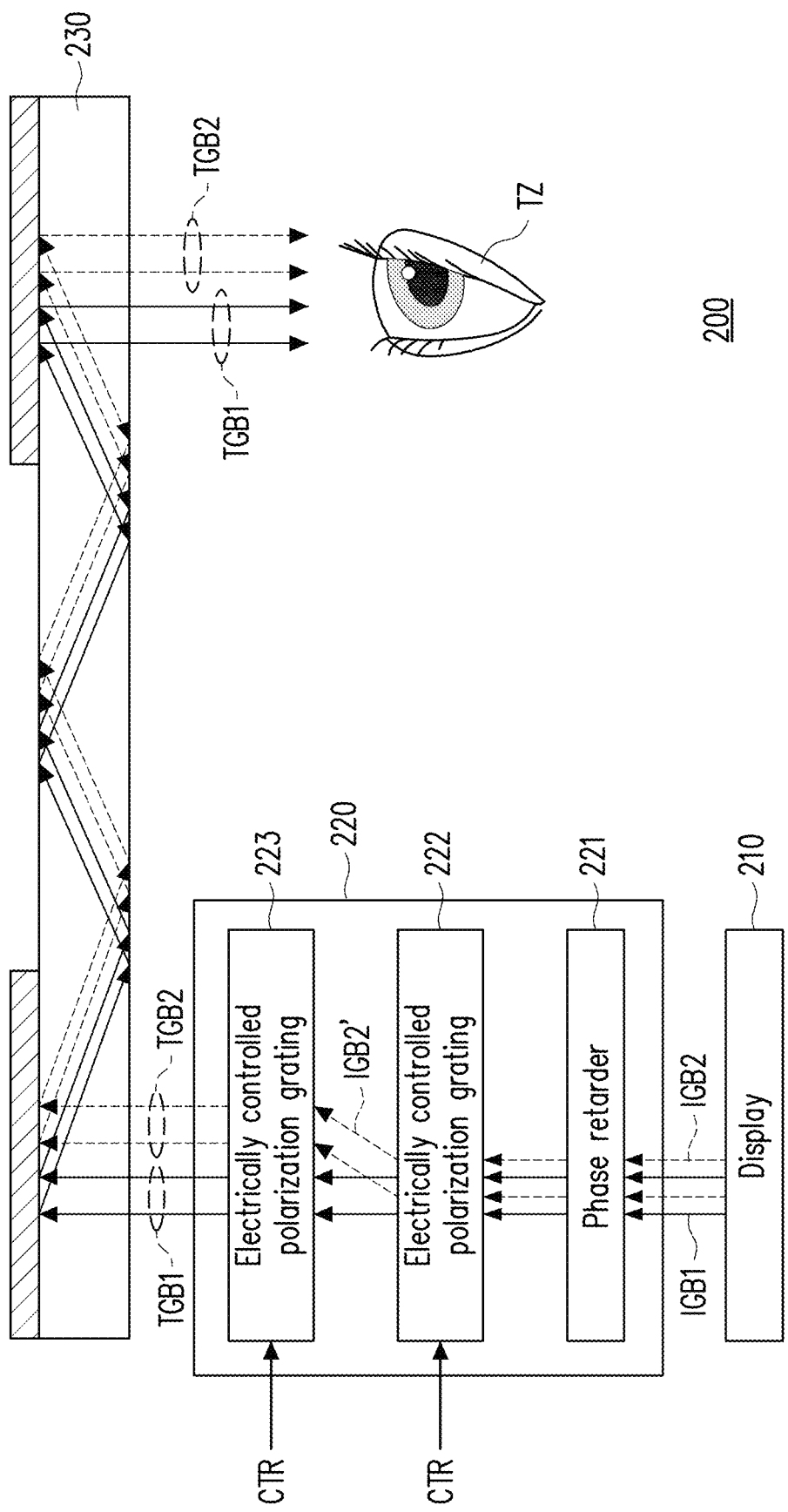
FIG. 2 is a schematic diagram of an implementation of a display device according to an embodiment of the disclosure.

Referring to FIG. 2 below, FIG. 2 is a schematic diagram of an implementation of a display device according to an embodiment of the disclosure. The display device 200 includes a display 210, an image beam shifter 220, and a light guiding component 230. The image beam shifter 220 includes a phase retarder 221 and electrically controlled polarization gratings 222 and 223. The phase retarder 221 and the electrically controlled polarization gratings 222 and 223 are overlapped with the display 210 in sequence.

In the present implementation, the display 210 generates image beams IGB1 and IGB2 in a first time interval and in a second time interval, respectively. The phase retarder 221 of the image beam shifter 220 receives the image beams IGB1 and IGB2 in sequence, and converts linearly polarized image beams IGB1 and IGB2 into circularly polarized image beams IGB1 and IGB2 respectively. In the present implementation, the phase retarder 221 may be a quarter wave plate.

The electrically controlled polarization gratings 222 and 223 may receive a control signal CTR, and decide whether to deflect the received image beams IGB1 and IGB2 according to the control signal CTR which is an electrical signal. In the present implementation, the electrically controlled polarization grating 222 enables the received image beam IGB1 to directly pass according to the control signal CTR in the first time interval. The electrically controlled polarization grating 222 deflects the image beam IGB2 by a first deflection angle according to the control signal CTR to generate a deflected image beam IGB2' in the second time interval. In addition, the electrically controlled polarization grating 223 also enables the image beam IGB1 to directly pass according to the control signal CTR in the first time interval to generate a projected image beam TGB1. The electrically controlled polarization grating 223 deflects the deflected image beam IGB2' at a second deflection angle according to the control signal CTR to generate a projected image beam TGB2 in the second time interval. The first deflection angle is, for example, +A degrees, and the second deflection angle may be −A degrees (A is any real number). That is, the first deflection angle and the second deflection angle may be mutually opposite numbers (additive inverse).

Based on the first deflection angle and the second deflection angle being mutually opposite numbers, the projected image beam TGB2 may have a projection direction parallel to that of the projected image beam TGB1. Moreover, based on a light deflection action generated by the electrically controlled polarization gratings 222 and 223 in the second time interval, emission positions of the projected image beam TGB1 and the projected image beam TGB2 may be different. In this way, the light guiding component 230 enables the projected image beam TGB1 to be transported to a first partition of the target zone TZ, and the projected image beam TGB2 to be transported to a second partition of the target zone TZ. The first partition is different from the second partition. Human eyes in the target zone TZ may observe different display pictures with time division.

Incidentally, the electrically controlled polarization gratings 222 and 223 in the present embodiment are electrically controllable liquid crystal polarization gratings.

Figure 3:
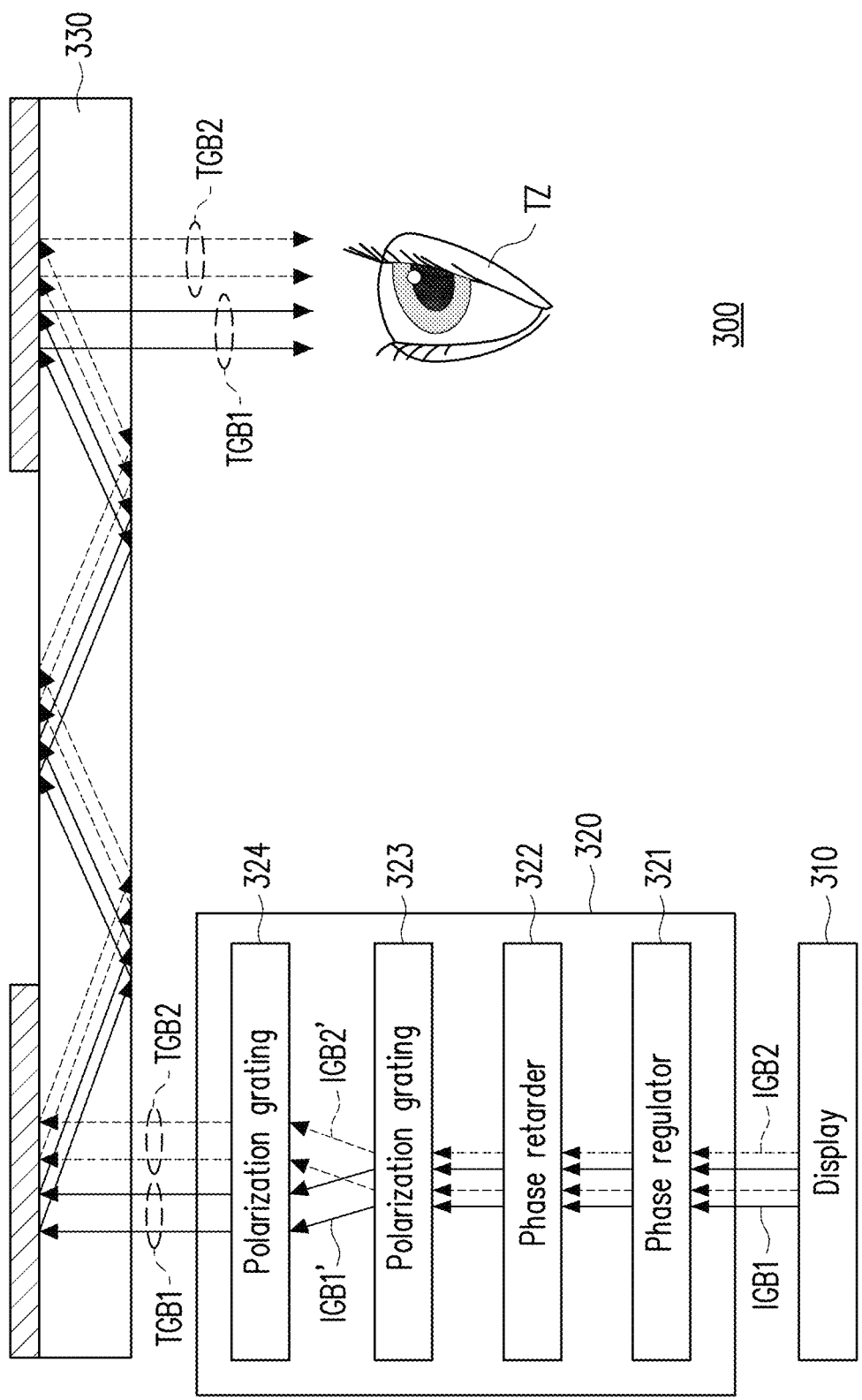
FIG. 3 is a schematic diagram of another implementation of a display device according to an embodiment of the disclosure.

Referring to FIG. 3, FIG. 3 is a schematic diagram of another implementation of a display device according to an embodiment of the disclosure. The display device 300 includes a display 310, an image beam shifter 320, and a light guiding component 330. The image beam shifter 320 includes a phase regulator 321, a phase retarder 322, and polarization gratings 323 and 324. The phase regulator 321, the phase retarder 322, and the polarization gratings 323 and 324 are mutually overlapped with the display 310 in sequence.

In the present implementation, the display 310 generates image beams IGB1 and IGB2 in a first time interval and in a second time interval, respectively. The image beam shifter 320 may be in an on state in the first time interval, and enable a polarization state of the image beam IGB1 which is a linearly polarized light source to be unchanged and transmitted to the phase retarder 322. In addition, the image beam shifter 320 may be in an off state in the second time interval, and enable a polarization state of the image beam IGB2 which is a linearly polarized light source to be changed and transmitted to the phase retarder 322.

The phase retarder 322 converts the image beam IGB1 whose polarization state is unchanged into a light beam with a first rotation direction in the first time interval, and converts the image beam IGB2 whose polarization state is changed into a light beam with a second rotation direction in the second time interval, where the first rotation direction is opposite to the second rotation direction. The phase retarder 322 may be a quarter wave plate, configured to convert linearly polarized light into circularly polarized light.

Moreover, the polarization grating 323 receives the image beam IGB1 in the first rotation direction in the first time interval, deflects the image beam IGB1 which is circularly polarized light at a first deflection angle to generate a deflected image beam IGB1', and transmits the deflected image beam IGB1' to the polarization grating 324. The polarization grating 323 further receives the image beam IGB2 in the second rotation direction in the second time interval, deflects the image beam IGB2 which is circularly polarized light at a second deflection angle to generate a deflected image beam IGB2', and transmits the deflected image beam IGB2' to the polarization grating 324.

The polarization grating 324 receives the deflected image beam IGB1' in the first time interval, and deflects the deflected image beam IGB1' which is circularly polarized light at a third deflection angle to generate a projected image beam TGB1. The polarization grating 324 also receives the deflected image beam IGB2' in the second time interval, and deflects the deflected image beam IGB2' which is circularly polarized light at a fourth deflection angle to generate a projected image beam TGB2. In the present embodiment, the first deflection angle and the third deflection angle may be mutually opposite numbers, and the second deflection angle and the fourth deflection angle may be mutually opposite numbers.

With the effect of the polarization gratings 323 and 324, positions where the projected image beams TGB1 and TGB2 are projected to the light guiding component 330 may be staggered. Therefore, the light guiding component 330 may transport the projected image beams TGB1 and TGB2 to different partitions of the target zone TZ.

It is worth mentioning that the polarization gratings 323 and 324 in the present implementation are non-electrically-controllable polarization gratings, for example, non-electrically-controllable liquid crystal polarization gratings.

Figure 4:
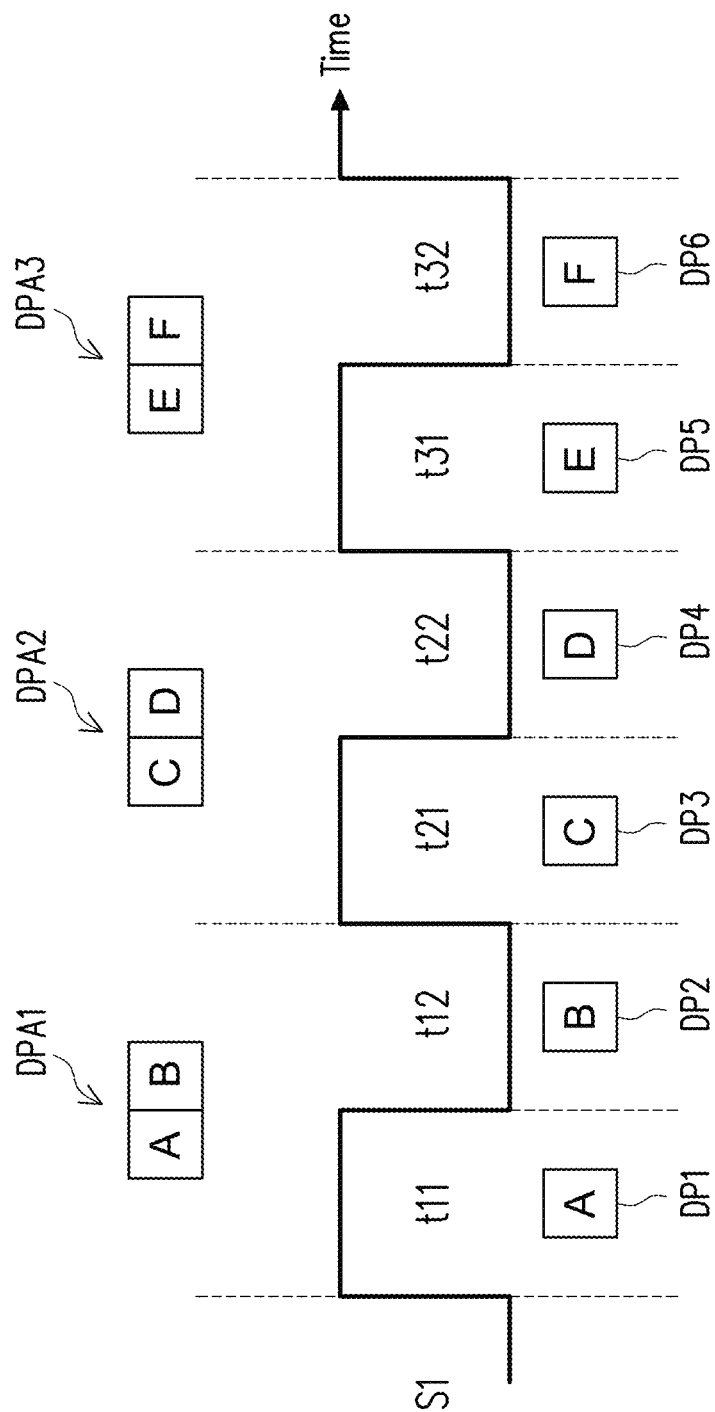
FIG. 4 is a schematic action diagram of a display device according to an embodiment of the disclosure.

Referring to FIG. 4 below, FIG. 4 is a schematic action diagram of a display device according to an embodiment of the disclosure. In FIG. 4, a state signal S1 indicates a working state of the image beam shifter. When the state signal S1 is at a high level, it indicates that the image beam shifter works at first time intervals t11, t21, and t31, and when the state signal S1 is at a low level, it indicates that the image beam shifter works at second time intervals t12, t22, and t32.

The display provides an image beam corresponding to a display picture DP1 in the first time interval t11. The image beam shifter makes a projected image beam be projected to a first position of the light guiding component according to the state signal S1. The display provides an image beam corresponding to a display picture DP2 in the following second time interval t12. The image beam shifter makes the projected image beam be projected to a second position of the light guiding component according to the state signal S1. In this way, the display pictures DP1 and DP2 can be combined to generate a combined display picture DPA1 in the target zone.

In addition, the display provides an image beam corresponding to a display picture DP3 in the first time interval t21. The image beam shifter makes a projected image beam be projected to a first position of the light guiding component according to the state signal S1. The display provides an image beam corresponding to a display picture DP4 in the following second time interval t22. The image beam shifter makes the projected image beam be projected to a second position of the light guiding component according to the state signal S1. In this way, the display pictures DP3 and DP4 can be combined to generate a combined display picture DPA2 in the target zone.

Similarly, the display may provide an image beam corresponding to a display picture DP5 in the first time interval t31. The image beam shifter makes a projected image beam be projected to a first position of the light guiding component according to the state signal S1. The display provides an image beam corresponding to a display picture DP6 in the following second time interval t32. The image beam shifter makes the projected image beam be projected to a second position of the light guiding component according to the state signal S1. In this way, the display pictures DP5 and DP6 can be combined to generate a combined display picture DPA3 in the target zone.

It can be known from the above descriptions that by changing the projection position of the projected image beam in a time-staggered manner, a single display can be used to produce a combined display picture of twice the size (or twice the resolution), so as to improve the work efficiency of the display device without increasing the size and weight of the display.

Figure 5:
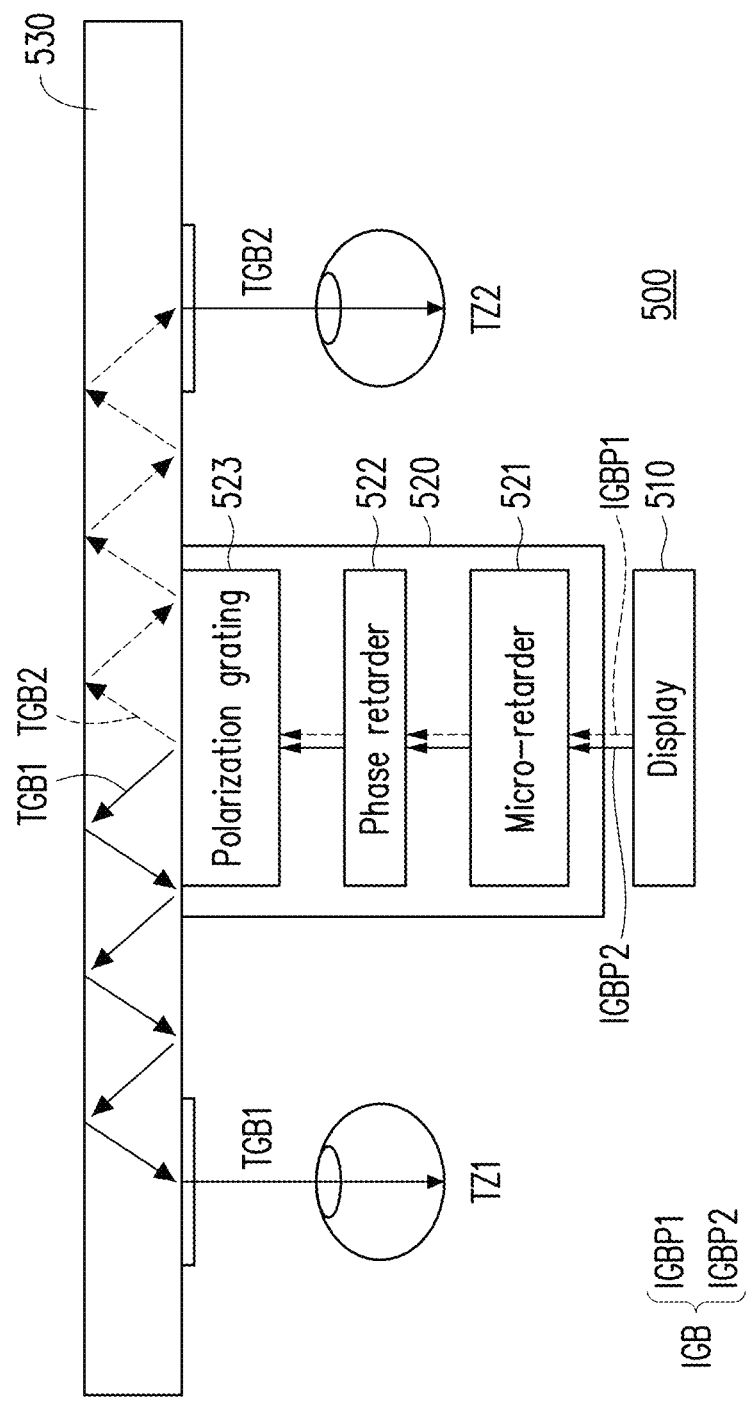
FIG. 5 is a schematic diagram of a display device according to another embodiment of the disclosure.

Referring to FIG. 5 below, FIG. 5 is a schematic diagram of a display device according to another embodiment of the disclosure. The display device 500 includes a display 510, an image beam shifter 520, and a light guiding component 530. The image beam shifter 520 includes a micro-retarder 521, a phase retarder 522, and a polarization grating 523. The micro-retarder 521, the phase retarder 522, and the polarization grating 523 are overlapped with one another and configured between the display 510 and the light guiding component 530 in sequence.

In the present embodiment, the display 510 generates an image beam IGB, where the image beam IGB includes a first image beam IGBP1 and a second image beam IGBP2. The first image beam IGBP1 and the second image beam IGBP2 may correspond to a first display picture viewed by one eye of a user and a second display picture viewed by the other eye of a user in a display picture to be generated by the display 510 respectively.

The micro-retarder 521 receives the first image beam IGBP1 and the second image beam IGBP2, and enables the first image beam IGBP1 and the second image beam IGBP2 to be in different (linear) polarization states respectively, for example, the first image beam IGBP1 is in a P-polarization state, and the second image beam IGBP2 is in an S-polarization state. The phase retarder 522 may be a quarter wave plate, and is configured to enable the first image beam IGBP1 and the second image beam IGBP2 to be in different rotation directions. For example, the phase retarder 522 enables the first image beam IGBP1 and the second image beam IGBP2 to be a left-handed rotation light beam and a right-handed rotation light beam respectively; or enables the first image beam IGBP1 and the second image beam IGBP2 to be a right-handed rotation light beam and a left-handed rotation light beam respectively.

The polarization grating 523 is a non-electrically-controllable polarization grating, configured to generate a first projected image beam TGB1 and a second projected image beam TGB2 according to the first image beam IGBP1 and the second image beam IGBP2 with different rotation directions. The first projected image beam TGB1 is a light beam with a first deflection angle, the second projected image beam TGB2 is a light beam with a second deflection angle, and the first deflection angle is different from the second deflection angle. For example, the first deflection angle and the second deflection angle may be mutually opposite numbers.

The light guiding component 530 receives the first projected image beam TGB1 and the second projected image beam TGB2, and based on the first projected image beam TGB1 and the second projected image beam TGB2 having opposite deflection angles, the light guiding component 530 may respectively transport the first projected image beam TGB1 and the second projected image beam TGB2 to a first target zone TZ1 and a second target zone TZ2 which is different from TZ1.

For example, the display device 500 is a head-mounted display device, and the first target zone TZ1 and the second target zone TZ2 may correspond to a user's left eye and right eye respectively. The first projected image beam TGB1 and the second projected image beam TGB2 may correspond to the first display picture viewed by one eye of a user and the second display picture viewed by the other eye of a user respectively, and may present a three-dimensional display picture effectively.

Figure 6:
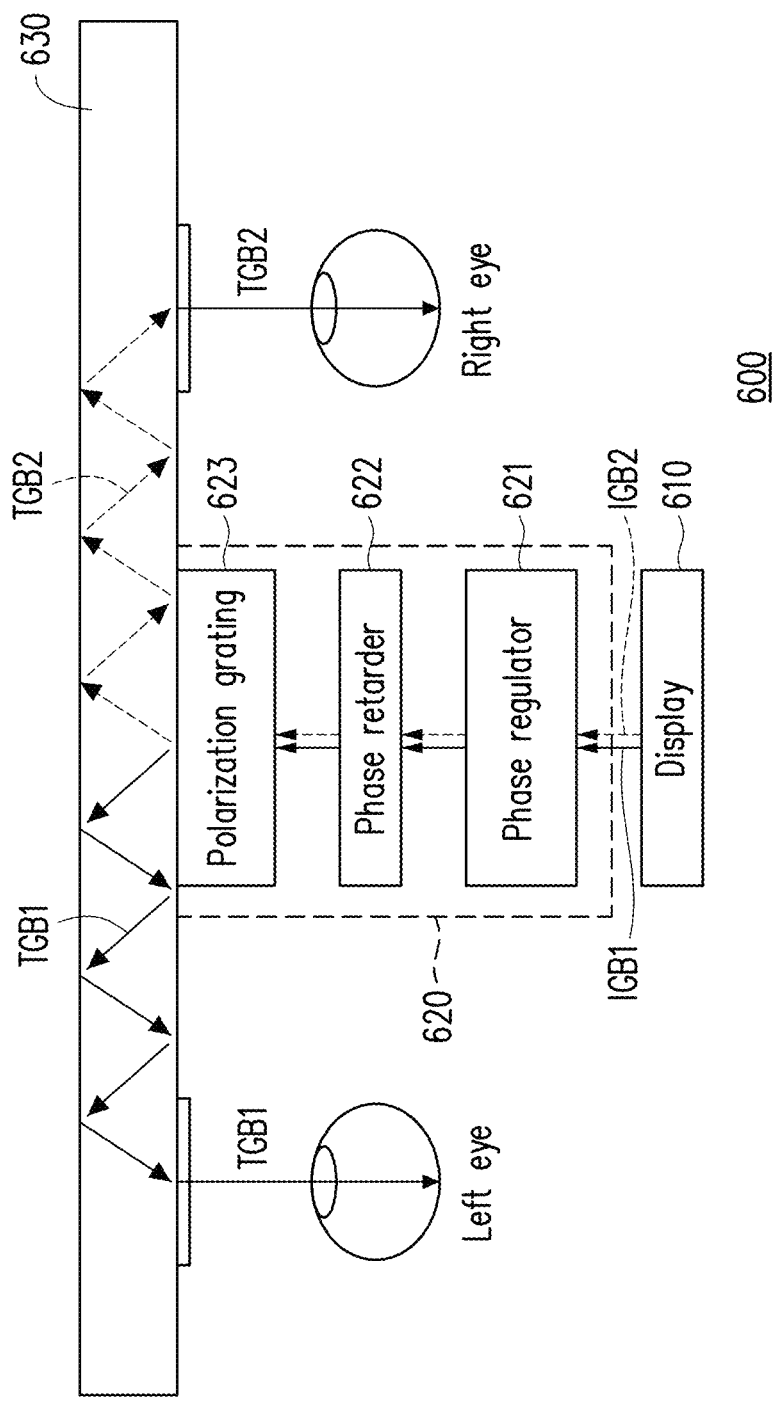
FIG. 6 is a schematic diagram of a display device according to another embodiment of the disclosure.

Referring to FIG. 6, FIG. 6 is a schematic diagram of a display device according to another embodiment of the disclosure. In FIG. 6, the display device 600 includes a display 610, an image beam shifter 620, and a light guiding component 630. The image beam shifter 620 includes a phase regulator 621, a phase retarder 622, and a polarization grating 623. The phase regulator 621, thee phase retarder 622, and the polarization grating 623 are overlapped with one another and configured between the display 610 and the light guiding component 630 in sequence. The phase regulator 621 may be a twisted nematic liquid crystal cell, configured to determine a polarization state of an output picture of the display 610. The display 610 and the phase regulator 621 are driven by time-division multiplexing to generate an S-polarized image beam IGB1 and a P-polarized image beam IGB2 respectively, where the image beams IGB1 and IGB2 are in different polarization states. The image beams IGB1 and IGB2 then pass through the phase retarder 622 and the polarization grating 623 to generate projected image beams TGB1 and TGB2 respectively. The light guiding component 630 then transmit the generated projected image beams TGB1 and TGB2 to the left eye and the right eye respectively.

Based on the above, the display device of the disclosure transmits projected image beams to different positions of a target zone or different target zones with time division or at the same time through an image beam shifter, thereby generating a combined display picture or a three-dimensional display picture. The display efficiency of the display device can be improved without increasing the size of the display.

What is claimed is:

1. A display device, comprising:
a display, generating an image beam;
an image beam shifter, receiving the image beam and generating a projected image beam; and
a light guiding component, receiving the projected image beam to transport the projected image beam to different positions of a target zone in sequence,
wherein the image beam shifter projects the projected image beams to different positions of the light guiding component with time division,
wherein the image beam shifter comprises:
an optical component, receiving the image beam, and enabling a first image beam and a second image beam in the image beam to be in different polarization states;
a phase retarder overlapped with the optical component, enabling the first image beam and the second image beam to be in different rotation directions; and
a polarization grating overlapped with the phase retarder, configured to generate a first projected image beam and a second projected image beam in the projected image beam in sequence in different time intervals, wherein the first projected image beam and the second projected image beam have different deflection angles,
wherein the polarization grating comprises:
a first electrically controlled polarization grating overlapped with the phase retarder, directly passing through the image beam in a first time interval according to a control signal, and deflecting the image beam at a first deflection angle in a second time interval to generate a deflected image beam; and
a second electrically controlled polarization grating overlapped with the first electrically controlled polarization grating, directly passing through the image beam in the first time interval according to the control signal to generate the first projected image beam, and deflecting the image beam at a second deflection angle in the second time interval to generate the second projected image beam;
wherein the first deflection angle and the second deflection angle are mutually opposite numbers.

2. The display device according to claim 1, wherein the display respectively generates the first image beam and the second image beam in a first time interval and in a second time interval in sequence; the image beam shifter makes the first projected image beam be projected to a first position of the light guiding component and makes the second projected image beam be projected to a second position of the light guiding component; and the first position is different from the second position.

3. The display device according to claim 2, wherein the first projected image beam and the second projected image beam correspond to a first display picture and a second display picture respectively.

4. The display device according to claim 2, wherein the light guiding component transports the first projected image to a first partition of the target zone, the light guiding component transports the second projected image to a second partition of the target zone; and the first partition is different from the second partition.

5. A display device, comprising:
a display, generating an image beam;
an image beam shifter, receiving the image beam and generating a projected image beam; and
a light guiding component, receiving the projected image beam to transport the projected image beam to different positions of a target zone in sequence,
wherein the image beam shifter projects the projected image beams to different positions of the light guiding component with time division,
wherein the image beam shifter comprises:
an optical component, receiving the image beam, and enabling a first image beam and a second image beam in the image beam to be in different polarization states;
a phase retarder overlapped with the optical component, enabling the first image beam and the second image beam to be in different rotation directions; and
a polarization grating overlapped with the phase retarder, configured to generate a first projected image beam and a second projected image beam in the projected image beam in sequence in different time intervals, wherein the first projected image beam and the second projected image beam have different deflection angles,
wherein the polarization grating comprises:
a first polarization grating, overlapped with the phase retarder, deflecting the image beam at a first deflection angle to generate a first deflected image beam in a first time interval, and deflecting the image beam at a second deflection angle to generate a second deflected image beam in a second time interval; and
a second polarization grating overlapped with the first polarization grating, deflecting the first deflected image beam at a third deflection angle to generate the first projected image beam in the first time interval; and deflecting the second deflected image beam at a fourth deflection angle to generate the second projected image beam in the second time interval;
wherein the first deflection angle and the third deflection angle are mutually opposite numbers, and the second deflection angle and the fourth deflection angle are mutually opposite numbers.

6. A display device, comprising:
a display, generating an image beam;
an image beam shifter, receiving the image beam and generating a first projected image beam and a second projected image beam; and
a light guiding component, receiving the first projected image beam and the second projected image beam, and transporting the first projected image beam to a first target zone and transporting the second projected image beam to a second target zone; wherein the first target zone is different from the second target zone,
wherein the image beam shifter comprises:

an optical component, receiving the image beam, and enabling a first image beam and a second image beam in the image beam to be in different polarization states;

a phase retarder overlapped with the optical component, enabling the first image beam and the second image beam to be in different rotation directions; and a polarization grating overlapped with the phase retarder, configured to generate the first projected image beam and the second projected image beam in sequence in different time intervals, wherein the first projected image beam and the second projected image beam have different deflection angles, wherein the polarization grating comprises:

a first electrically controlled polarization grating overlapped with the phase retarder, directly passing through the image beam in a first time interval according to a control signal, and deflecting the image beam at a first deflection angle in a second time interval to generate a deflected image beam; and a second electrically controlled polarization grating overlapped with the first electrically controlled polarization grating, directly passing through the image beam in the first time interval according to the control signal to generate the first projected image beam, and deflecting the image beam at a second deflection angle in the second time interval to generate the second projected image beam;

wherein the first deflection angle and the second deflection angle are mutually opposite numbers.

7. The display device according to claim 6, wherein the first projected image beam and the second projected image beam respectively correspond to a first display picture viewed by one eye of a user and a second display picture viewed by the other eye of a user.

8. The display device according to claim 6, wherein the optical component is a micro-retarder.

9. The display device according to claim 6, wherein the optical component is a phase regulator.

10. The display device according to claim 6, wherein the first projected image beam is a light beam with a first deflection angle, the second projected image beam is a light beam with a second deflection angle; and the first deflection angle is different from the second deflection angle.

\* \* \* \* \*